United States Patent
Hollister

(10) Patent No.: US 12,050,577 B1
(45) Date of Patent: Jul. 30, 2024

(54) SYSTEMS AND METHODS OF GENERATING DYNAMIC EVENT TREE FOR COMPUTER BASED SCENARIO TRAINING

(71) Applicant: ARCHITECTURE TECHNOLOGY CORPORATION, Eden Prairie, MN (US)

(72) Inventor: Dahyun Hollister, Ithaca, NY (US)

(73) Assignee: Architecture Technology Corporation, Eden Prairie, MN (US)

(*) Notice: Subject to any disclaimer, the term of this patent is extended or adjusted under 35 U.S.C. 154(b) by 116 days.

(21) Appl. No.: 16/267,252

(22) Filed: Feb. 4, 2019

(51) Int. Cl.
*G06F 7/00* (2006.01)
*G06F 3/0482* (2013.01)
*G06F 3/0486* (2013.01)
*G06F 16/22* (2019.01)
*G06F 16/28* (2019.01)
*G06N 20/00* (2019.01)

(52) U.S. Cl.
CPC ........ *G06F 16/2246* (2019.01); *G06F 3/0482* (2013.01); *G06F 3/0486* (2013.01); *G06F 16/284* (2019.01); *G06N 20/00* (2019.01)

(58) Field of Classification Search
CPC .... G06F 16/35; G06F 16/248; G06F 16/2246; G06F 16/284; G06F 3/0482; G06F 3/0486; G06N 20/00
USPC ............... 707/736, 738, 790, 793, 797, 798, 707/999.005
See application file for complete search history.

(56) References Cited

U.S. PATENT DOCUMENTS

| | | | |
|---|---|---|---|
| 6,292,792 B1 * | 9/2001 | Baffes | G06N 5/022 706/45 |
| 7,574,018 B2 | 8/2009 | Luo | |
| 7,920,071 B2 | 4/2011 | Baillot | |
| 8,406,682 B2 | 3/2013 | Elesseily et al. | |

(Continued)

FOREIGN PATENT DOCUMENTS

| | | |
|---|---|---|
| KR | 10-2042989 B1 | 12/2019 |
| WO | WO-00/04478 A2 | 1/2000 |

OTHER PUBLICATIONS

Author: Picoco et al., Title : Dynamic Event Tree Generation With Raven—MAAP5 Using Finite State Machine System Models, Publised: Sep. 25, 2017, pp. 100-106.*

(Continued)

*Primary Examiner* — Md I Uddin
(74) *Attorney, Agent, or Firm* — Foley & Lardner LLP

(57) ABSTRACT

Embodiments disclosed herein describe systems, methods, and products to generate dynamic event trees that may be generated with ease and rapidly reconfigured. A computer may provide, e.g., through a web service, a user interface for a user (e.g., a trainer) to retrieve and customize event nodes from an event node database. The computer may also provide an event tree template where the user may simply drag and drop event nodes and use the dynamic event sequencers to generate hierarchical interconnections between the event nodes to generate a dynamic event tree. The computer may further execute a machine learning model that may recommend one or more event nodes. The computer may continuously train the machine learning model based upon the dynamic event tree and based upon whether the user has accepted the recommended event node.

20 Claims, 4 Drawing Sheets

(56) References Cited

U.S. PATENT DOCUMENTS

| | | | |
|---|---|---|---|
| 9,076,342 | B2 | 7/2015 | Brueckner et al. |
| 9,911,352 | B2 | 3/2018 | Williams et al. |
| 10,307,583 | B2 | 6/2019 | Williams et al. |
| 10,307,853 | B2 | 6/2019 | Becker |
| 10,529,140 | B1 | 1/2020 | Ravindran et al. |
| 2005/0216243 | A1 | 9/2005 | Graham et al. |
| 2009/0046893 | A1 | 2/2009 | French et al. |
| 2012/0129141 | A1 | 5/2012 | Granpeesheh |
| 2012/0214147 | A1 | 8/2012 | Ernst et al. |
| 2014/0162224 | A1 | 6/2014 | Wallace et al. |
| 2015/0050623 | A1 | 2/2015 | Falash et al. |
| 2015/0099252 | A1 | 4/2015 | Anderson et al. |
| 2015/0154875 | A1 | 6/2015 | Digiantomasso et al. |
| 2016/0019217 | A1* | 1/2016 | Reblitz-Richardson ............ G06F 16/444 707/731 |
| 2016/0063883 | A1 | 3/2016 | Jeyanandarajan |
| 2016/0077547 | A1 | 3/2016 | Aimone et al. |
| 2016/0321583 | A1* | 11/2016 | Jones ............ G06F 40/134 |
| 2017/0032694 | A1 | 2/2017 | Brueckner et al. |
| 2017/0136296 | A1 | 5/2017 | Barrera et al. |
| 2017/0162072 | A1 | 6/2017 | Horseman et al. |
| 2017/0221267 | A1 | 8/2017 | Tommy et al. |
| 2018/0165983 | A1 | 6/2018 | Ragozzino et al. |
| 2018/0203238 | A1 | 7/2018 | Smith, Jr. |
| 2018/0293802 | A1 | 10/2018 | Hendricks et al. |
| 2019/0025906 | A1 | 1/2019 | Strong et al. |
| 2019/0034489 | A1* | 1/2019 | Ziegler ............ G06F 16/248 |
| 2019/0282324 | A1 | 9/2019 | Freeman et al. |
| 2019/0304188 | A1 | 10/2019 | Bridgeman et al. |
| 2019/0373297 | A1* | 12/2019 | Sarkhel ............ G06K 9/6247 |
| 2020/0012671 | A1* | 1/2020 | Walters ............ G06F 9/547 |
| 2020/0033144 | A1* | 1/2020 | Du ............ G01C 21/3476 |
| 2020/0135042 | A1 | 4/2020 | An et al. |
| 2021/0027647 | A1 | 1/2021 | Baphna et al. |
| 2021/0043106 | A1 | 2/2021 | Kotra et al. |
| 2021/0335148 | A1 | 10/2021 | Fujiwara et al. |

OTHER PUBLICATIONS

Title: Distributed Dynamic Event Tree Generation for Reliability and Risk Assessment, Author: Rutt et al., Date: Jun. 2006, Publisher: IEEE, pp. 61-70.*

Dahyun Hollister, Phase I SBIR Proposal, "SCENTS, Scenario-based Training Service", Topic No. and Name: A18-092 Scenario-based Training Content Discovery, and Adaptive Recommendation, Architecture Technology Corporation, Feb. 7, 2018, 23 pages.

"ATCorp Announces Virtual, Online Cyber Security Training for the Utility Industry", https://www.tdworld.com/safety-and-training/article/20972718/atcorp-announces-virtual-online-cyber-security-training-for-the-utility-industry, Jun. 19, 2019 (4 pages).

"Military Simulation and Virtual Training Market Worth US$ 15.12 Billion By 2026 CAGR 4.0%" Acumen Research and Consulting, press release, Jan. 10, 2019, 3 pages.

Architecture Technology Corporation, "Cyrin—Virtual Advanced Cyber Training Now With Three Levels of Training Designed for the Utility Industry", Press Release, Corporate Headquarters, https://www.pressrelease.com/files/fb/0f/548a5a42ceeed67a8ace4e5123d2.pdf; Jun. 6, 2019; 10 pages.

Architecture Technology Corporation, Proposal No. N192-094, N192-094-0032, Jun. 19, 2019.

Chief of Staff, United States Air Force; "Enhancing Multi-domain Command and Control . . . Tying It All Together," https://www.af.mil/Portals/1/documents/csaf/letter3/Enhancing_Multi-domain_CommandControl.pdf, Sep. 18, 2018; 3 pages.

Dean Putnam, NAVSEA, "Multiplayer Serious Game for Anti-Submarine Warfare Sonar Operator Training," Navy SBIR 2019.2-Topic N192-094, https://www.ncbi.nlm.nih.gov/pmcAccessed Jun. 19, 2019, 3 pages.

John Morgan,, "Anti-Submarine Warfare A Phoenix for the Future," Undersea Warfare Magazine, 1998, https://www.public.navy.mil/subfor/underseawarfaremagazine/Issues/Archives/issue_01/anti.htmAccess ed Jun. 19, 2019, 7 pages.

Kim, Roger G., Operational planning for theater anti-submarine warfare, Calhoun Institutional Archive of the Naval Postgraduate School, http://hdl.handle.net/10945/53000, Mar. 2017, 52 pages.

Lorne Fade, "How Virtual Reality is Transforming Military Training", https://vrvisiongroup.com/how-virtual-reality-is-transforming-military-training/, May 30, 2018, 12 pages.

LT Fred C. Lentz, LT Alan B. Shaffer, David R. Pratt, John S. Falby & Michael J. Zyda, "NPSNET: Naval Training Integration," Proceedings of the 13th DIS Workshop, Orlando, Florida, pp. 107-112, ba6cee448ad439f38d8e69ee3bd427fec63b.pdf, Sep. 18-22, 1995, 6 pages.

Maj. Justin Reynolds, Headquarters Air Force Strategic Integration Group, "Multi-domain command and control is coming," https://www.af.mil/News/Article-Display/Article/1644543/multi-domain-command-and-control-is-coming/, Sep. 25, 2018; 3 pages.

Press Release, Corporate Headquarters, Architecture Technology Corporation; "CYRIN—Virtual Advanced Cyber Training Now With Three Levels of Training Designed for the Utility Industry", https://www.pressrelease.com/files/fb/0f/548a5a42ceeed67a8ace4e5123d2.pdf; Jun. 6, 2019; 10 pages.

Roland J. Yardley, Harry J. Thie, John F. Schank, Jolene Galegher, Jessie L. Riposo, "Use of Simulation for Training in the U.S. Navy Surface Force," Rand Corp, National Defense Research Institute, https://www.rand.orq/content/dam/rand/pubs/monograph_reports/2005/MR1770.gdf, 2003, 123 pages.

Shelly Singh, "Virtual Reality Market worth $53.6 billion by 2025", press release, https://www.marketsandmarkets.com/PressReleases/ar-market.asp, 7 pages.

SimCYRIN Phase II proposal (vol. 2) Final, completed Oct. 25, 2015.

SimCYRIN, Simulation Deployment and Management System, ATC-NY, Topic: AF183-006, Proposal#: F183-006-0193.

Stephen Brueckner, Frank Adelstein, David Guaspari, Joseph Weeks (Air Force Research Laboratory); "Automated Computer Forensics Training in a Virtualized Environment", Digital Forensic Research Conference, DFRWS 2008 USA, Aug. 11-13, 2008; 8 pages.

Vuna Huh Wong, Sebastian Joon Bae, Elizabeth M. Bartels, Benjamin Smith, "Next-Generation Wargaming for the U.S. Marine Corps", Rand Corporation, Nov. 30, 2019; (253 pages).

Yariv Levski, "10 Virtual Reality Business Opportunities Poised to Explode," https://appreal~vr.com/blog/10-virtual-reality-business-opportunities/, Copyright © 2020 AppReal-VR, 16 pages.

Yariv Levski, "15 Greatest Examples of Virtual Reality Therapy", https://agpreal~vr.com/blog/virtualreality-therapy-potential/, Press Release, Copyright © 2020 AppReal-VR, 15 pages.

* cited by examiner

SYSTEMS AND METHODS OF GENERATING DYNAMIC EVENT TREE FOR COMPUTER BASED SCENARIO TRAINING

TECHNICAL FIELD

This application is generally related to computer based training and more specifically towards generating dynamic event trees for computer based scenario training.

BACKGROUND

As computing devices have become smaller and less expensive due the computer industry's incessant focus on miniaturization, computer based training (CBT) has been increasingly prevalent. As an example, computers are used to present digital training material such as training manuals. A corporation may provide training manuals configured to be rendered by a portable computing device such as an e-book reader or a tablet computer. In addition computing devices may display video and play audio containing the training material.

However, conventional CBT is confined to pre-scripted training. The training material remains static once loaded to the computer. For example, a training manual presented on a tablet computer is just a static rendering of content that does not change unless the manual provider uploads an updated training material. Similarly, the audio and video training materials once produced and uploaded to a computing device cannot be changed.

Conventional pre-scripted training therefore has several technical shortcomings when it comes to scenario-based training. Scenario-based training may be used to train first responders, pilots, military, and other occupations that require a fast and apt response to rapidly evolving situations. A pre-scripted training, where the training materials have been pre-determined and pre-packaged is not effective for scenario-based training. For example, a rapidly evolving scenario may have multiple resolutions or multiple routes to get to the right answer. Furthermore, different trainees learn at a different paces, the pre-scripted training may not have the flexibility to accommodate the trainees with different pace of learning.

SUMMARY

What is therefore desired are systems and methods that facilitate generating dynamic modules for computer-implemented scenario based training (also referred to as computer based scenario training). What is further desired and methods that provide an interactive interface to assist a trainer to generate the dynamic modules.

Embodiments presented herein attempt to solve the aforementioned technical problems and may provide other solutions as well. A dynamic event tree builder (also referred to as dynamic scenario tree builder) may retrieve a plurality of event tree nodes (also referred to as event nodes) from an event tree database (also referred to as event nodes database) based upon predetermined criteria. The dynamic event tree builder may display an interactive graphical user interface to allow a user (e.g., a trainer) to customize at least one event tree node of the plurality of event tree nodes. The interactive graphical user interface may also allow the user to generate a dynamic event tree containing one or more event tree nodes of the plurality of event tree nodes including the at least one customized event node tree. The dynamic event tree may further include dynamic event sequencers hierarchically interconnect the one or more event tree nodes in the dynamic event tree. The dynamic event tree builder may also execute a machine learning model. The machine learning model, when executed may generate a recommended event tree node. The user may accept the recommended event tree node to update the dynamic event tree. Alternatively, the user may decline the recommended event tree node. The dynamic event tree builder may further train the machine learning model based on the dynamic event tree that was generated and also based upon whether the user accepted the recommended user tree node. Therefore, the machine learning model is continuously trained to provide recommendations in the future utilizations of the dynamic event tree builder.

In one embodiment, a computer-implemented method comprises displaying, by a computer, a graphical user interface containing a plurality of event tree nodes retrieved from an event tree database based upon a predetermined criteria; customizing, by the computer, at least one of the plurality of event tree nodes based upon one or more customization instructions received from a user; generating, by the computer, a dynamic event tree containing one or more of the plurality of event tree nodes selected by the user including the at least one customized node, the dynamic event tree further containing dynamic event sequencers hierarchically interconnecting the one or more event tree nodes; executing, by the computer, a machine learning model to generate at least one recommended event tree node; updating, by the computer, the event tree node to include the recommended event tree node in response to the user accepting the recommended event tree node; further training, by the computer, the machine learning model based upon dynamic event tree and the update to the dynamic event tree; and deploying, by the computer, the dynamic event tree for computer based scenario training.

In another embodiment, a system comprises a non-transitory storage medium storing an event tree database; a processor electrically coupled to the non-transitory storage medium and configured to: display a graphical user interface containing a plurality of event tree nodes retrieved from the event tree database based upon predetermined criteria; customize at least one of the plurality of event tree nodes based upon one or more customization instructions received from a user; generate a dynamic event tree containing one or more of the plurality of event tree nodes selected by the user including the at least one customized node, the dynamic event tree further containing dynamic event sequencers hierarchically interconnecting the one or more event tree nodes; execute a machine learning model to generate at least one recommended event tree node; update the event tree node to include the recommended event tree node in response to the user accepting the recommended event tree node; further train the machine learning model based upon the dynamic event tree and the update to the dynamic event tree; and deploy the dynamic event tree for computer based scenario training It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
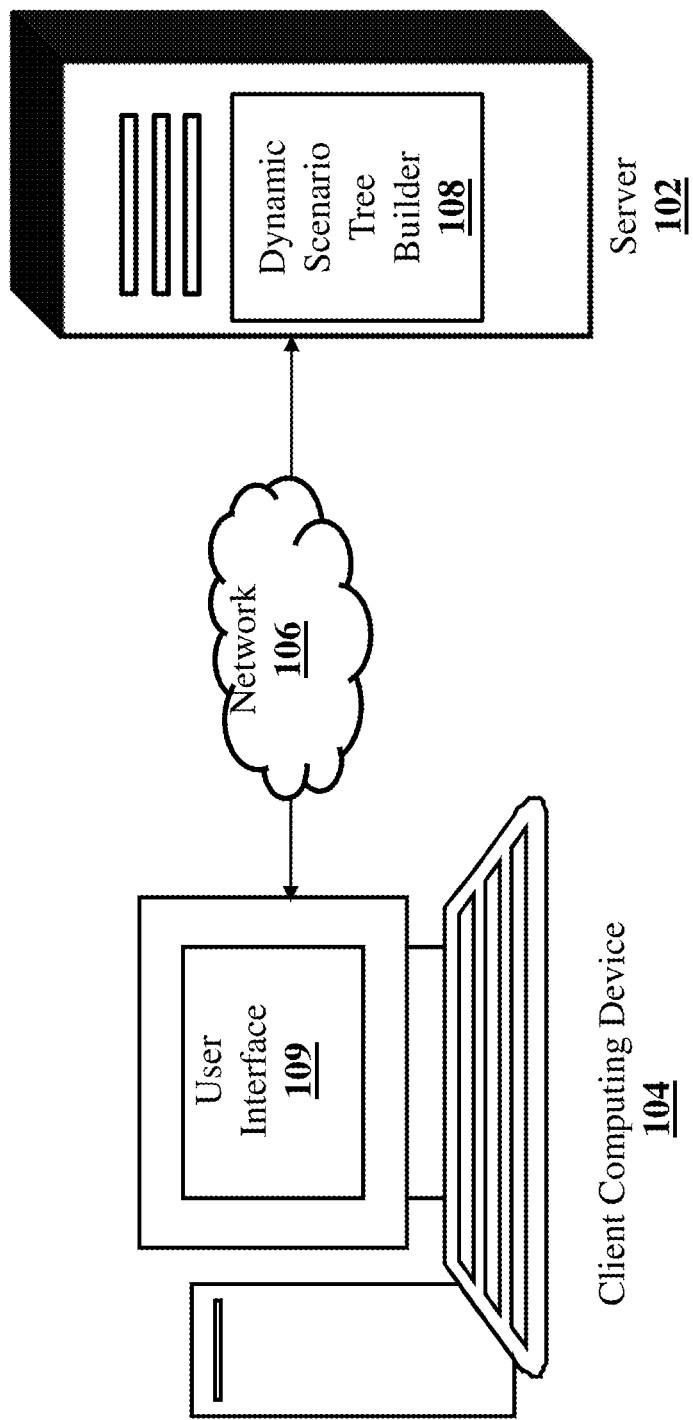
FIG. 1 shows an illustrative system for generating dynamic event trees, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for generating dynamic event trees (also referred to as dynamic scenario trees). A dynamic event tree may be used for a training scenario in computer-based training (CBT). A dynamic event tree may include event nodes containing a computer functionality during the corresponding stage of the training. The computer functionality may include providing a prompt, displaying a visual object, presenting a text, providing a stimulus, providing response, and/or any other type of computer functionality. In addition to the event nodes, the dynamic event tree may include dynamic event sequencers that provide interconnections between the nodes of the dynamic event tree. The dynamic event sequencers may load or otherwise point to next event based on the trainee's response to a current event node. The dynamic event node may also comprise result nodes to indicate whether a trainee has a reached a right or a wrong result.

Unlike the conventional pre-scripted CBT, the embodiments disclosed herein generate dynamic event trees that may be generated with ease and rapidly reconfigured. A computer may provide, e.g., through a web service, a user interface for a user (e.g., a trainer) to retrieve and customize event tree nodes from an event tree database. The computer may also provide an event tree template where the user may simply drag and drop event tree nodes and use the dynamic event sequencers to generate hierarchical interconnections between the event tree nodes. The computer may further execute a machine learning model that may recommend one or more event tree nodes. The computer may continuously train the machine learning model based upon the event tree and based upon whether the user has accepted the recommended event tree node.

The computer may then deploy the dynamic event tree for in a computer based scenario training. Once deployed, the computer may provide an interface and functionality to rapidly reconfigure the dynamic event tree node, even when being used in training. Using the rapid reconfiguration functionality and interface, the user may modify one or more event tree nodes and one or more dynamic event sequencers. For example, the user may modify in real time an event tree node or a dynamic event sequencer that is hierarchically below the event tree node being executed by the computer. The computer may further train the machine learning model based upon the rapid reconfiguration of the dynamic event tree node.

FIG. 1 shows an illustrative system 100 for generating a dynamic training scenario tree, according to an embodiment. The system 100 may include a server 102, a client computing device 104, and a network 106. It should be understood that the components of the system 100 described herein are merely illustrative and additional, alternative, and fewer number of components should be considered within the scope of this disclosure.

The server 102 may be any kind of computing device hosting a dynamic scenario tree builder 108, functionality of which is described throughout this disclosure. Non-limiting examples of the server 102 may include a server computer, a desktop computer, a laptop computer, and/or any other computing device. Within the server 102, software modules forming the dynamic scenario tree builder (also referred to as a dynamic tree builder) 108 may be stored as computer program instructions in an electronic storage. A processor in the server 102 may execute the computer program instructions to implement the functionality described throughout this disclosure. The processor may store the results of the execution to a memory within the server 102.

The client computing device 104 may be any kind of computing device such as a desktop computer, a laptop computer, a tablet computer, a smartphone, and/or any other type of computing device. The client computing device 104 may include an electronic storage storing computer program instructions and at least one processor that may execute the computer program instruction. The client computing device 104 may also include a memory to store the computer program instructions during execution and store the results of the execution.

The client computing device 104 may include computer applications (e.g., utility applications) stored as computer program instructions. A computer application, when executed by a processor, may provide a specific computer functionality. One such application may be a web browser that may communicate over the network 106 to the server 102 or any other computing systems. The client computing device 104 may include a user interface 109 that may display data generated by or retrieved by one or more applications running in the client computing device 104.

The network 106 may include any form of communication medium between the client computing device 104 and the server. Examples of the network 106 include, hut are not limited to, Local Area Network (LAN), Wireless Local Area Network (WLAN), Metropolitan Area Network (MAN), Wide Area. Network (WAN), and the Internet. The communication over the network 205 may be performed in accordance with various communication protocols, such as Transmission Control Protocol and. Internet Protocol (TCP; IP), User Datagram Protocol (UDP), and IEEE communication protocols.

Figure 2:
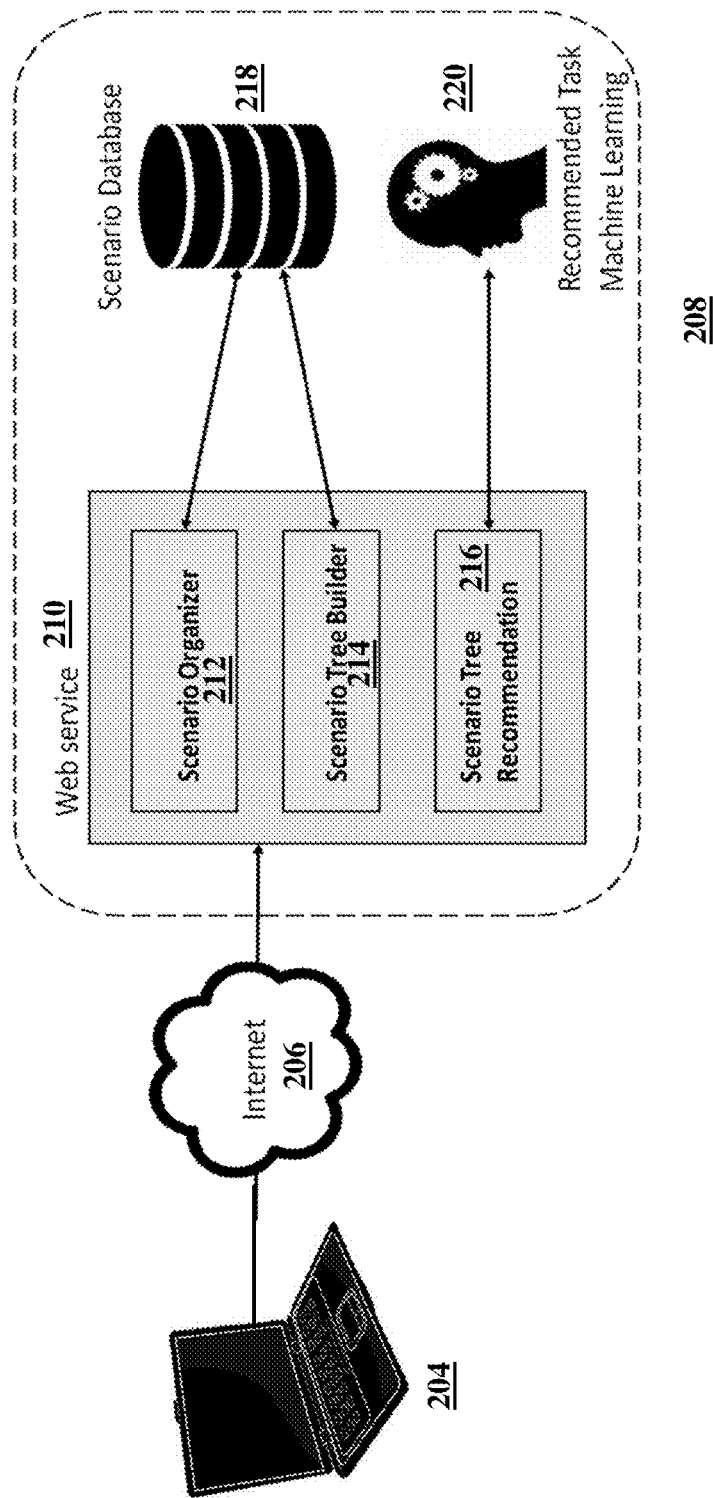
FIG. 2 shows an illustrative system for generating dynamic event trees, according to an embodiment.

FIG. 2 shows an illustrative system 200 for generating a dynamic training scenario tree (also referred to as dynamic event tree), according to an embodiment. The system 200 may comprise a client computing device 204 connected to a dynamic scenario tree builder 208 through the internet 206. It should be understood that the components of the system 200 described herein are merely illustrative and additional, alternative, and fewer number of components should be considered within the scope of this disclosure.

The client computing device 204 may any computing device including but not limited to desktop computer, laptop computer, tablet computer, smartphone, and/or any other computing device. The client computing device 204 may include an electronic storage with a plurality of computer program instructions, a processor to execute the plurality of computer program instructions, and a memory to store the results of the execution. In addition to the operating system, the client computing device 204 may include applications configured for different functionalities. For example, the client computing device 204 may include a web browser to access a web service 210 within the dynamic scenario tree builder 208 through the internet 206.

The dynamic scenario tree builder 208 may include hardware and software modules to provide the dynamic scenario building functionality described herein. The dynamic scenario tree builder 208 may be hosted by any kind of server such as a webserver. It should however be understood that a server hosting the dynamic scenario tree builder 208 is just an illustration and the entirety or a portion of the dynamic scenario tree builder 208 may be hosted by any type of computing device such as a desktop computer, laptop computer, and/or any other computing device.

The dynamic scenario tree builder 208 may include a web service 210 for various functionality described herein. The web service 210 may be accessed by the client computing device 204 through the internet 206 using a browser. The web service 210 may include a scenario organizer engine 212, scenario tree builder engine 214, and a scenario tree recommendation engine 216. It should be understood that these engines and the corresponding functionality within the web service 210 are merely illustrative and additional, alternative, and a fewer functionality may be provided by the web service 210.

The scenario organizer engine 212 may allow a user to access and customize scenarios stored in a scenario database 218. For example, the scenario organizer engine 212 may provide an interface for a user (using the client computing device 204) to retrieve a scenario from the scenario database 218. In some embodiments, the scenario database 218 may be a relational database. The interface may be displayed on a web browser in the client computing device 204. The interface may allow the user to perform a keyword search to retrieve relevant scenarios from the scenario database 218. For a retrieved scenario, the interface may allow the user to customize the scenario. Using the customization feature, the computer may change a text element, a visual element, and/or a functional element associated with the retrieved scenario.

The scenario organizer engine 212 may further provide an interface tool that allows a user to upload a user-generated scenario. The user generator scenario may include text, image, animation, and/or computer executable instructions representing a particular scenario in computer-based scenario training. The scenario organizer engine 212 may save the user-generated scenario to the scenario database 218 for retrievals and customizations.

The scenario tree builder engine 214 may allow the user to generate a dynamic scenario tree. To that end, the scenario tree builder engine 214 may display an interactive interface on the web browser at the client computing device 204. The interactive interface may be a graphical user interface (GUI) showing the retrieved scenarios as graphical icons. The user may drag and drop the graphical icons to generate the dynamic scenario tree. Furthermore, the scenario tree builder engine 214 may allow the user to create interconnections between the scenarios using dynamic event sequencers. Dynamic event sequencers may direct computer operations through a dynamic scenario tree based upon trainee responses to various scenarios into the dynamic sequence tree.

In some embodiments, the scenario tree builder engine 214 may provide a dynamic scenario tree template for the user to create the dynamic scenario. The dynamic scenario tree template may include a plurality of containers for the scenarios and dynamic event sequencers interconnecting the containers. To create the dynamic scenario tree, the user may drag and drop the retrieved scenarios to the containers and/or modify the corresponding dynamic event sequencers. In addition, the scenario tree builder engine 214 may provide other graphical tools for the user to easily generate and reconfigure the dynamic scenario tree.

The scenario tree recommendation engine 216 may interact with a recommended task machine learning model 220 and provide one or more scenario recommendations. The recommendations may be based upon previous dynamic scenario trees generated by the computer, the user's response to previous recommendations, and/or the current dynamic scenario tree being generated.

The recommended task machine learning model 220 may be any kind of machine learning model that is trained to generate recommended scenarios. The recommendation task machine learning model 220 may be trained through a supervised training using a labeled training data. In supervised training, the recommended task machine learning model 220, the errors in prediction (e.g., generating a recommended scenario) is back-propagated until the machine learning model 220 generates a prediction within a desired level of accuracy. Furthermore, the machine learning model 220 is continuously trained based upon whether the user accepts or rejects a recommended scenario.

In operation, the scenario tree recommendation engine 216 continuously tracks the generation of the dynamic scenario tree. For example, the scenario tree recommendation engine may 216 track the scenarios that were selected and the dynamic event sequencers used to interconnect the scenarios. The scenario tree recommendation engine 216 may feed the tracking data to the machine learning model 220. The machine learning model 220 may generate a recommended scenario based upon the tracking data. The scenario tree recommendation engine 216 may then present the recommended scenario in the graphical user interface (or any other type of dashboard environment). The user may accept or reject the recommended scenario. The scenario tree recommendation engine 216 may provide data indicating the acceptance or rejection back to the machine learning model 220.

In addition to providing the recommended scenario, the machine learning model 220 may be further trained (or refined) based upon the dynamic scenario tree. The dynamic scenario tree and the user's response (e.g., acceptance or rejection) to the recommended scenario may be used as a training data. The machine learning model 220 may learn the pattern in the dynamic scenario tree. Furthermore, the machine learning model 220 may learn what type of recommended scenarios were accepted and what type of recommended scenarios were accepted.

A computer may then deploy the dynamic scenario tree to provide a computer based scenario training session. The dynamic scenario tree builder 208 may provide the user with a graphical user interface for the user to rapidly reconfigure the dynamic scenario tree during the training session.

Figure 3:
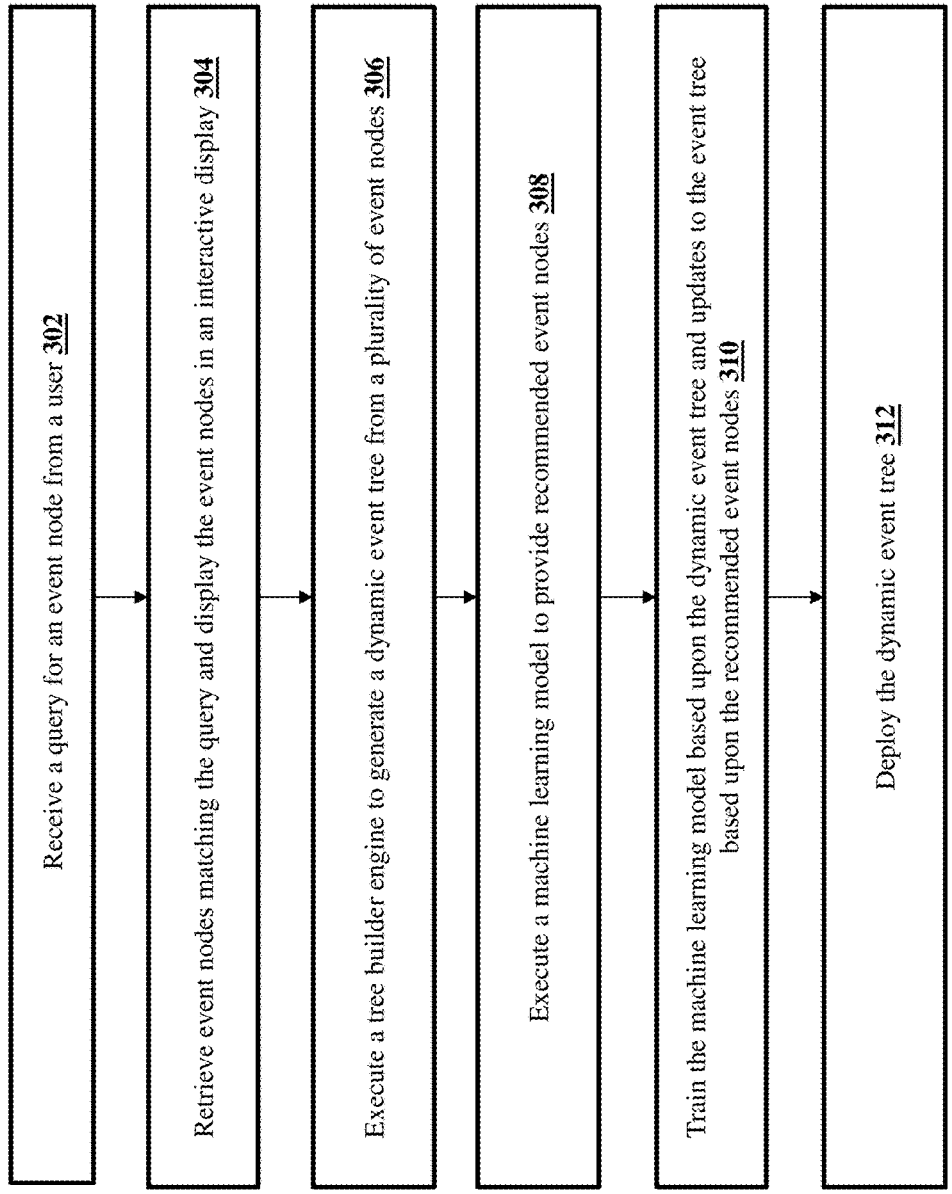
FIG. 3 shows an illustrative method for generating dynamic event trees, according to an embodiment.

FIG. 3 shows a flow diagram of an illustrative method 300 of generating a dynamic scenario tree, according to an exemplary embodiment. It should be understood that the steps described herein are merely illustrative and additional, alternative, and fewer number of steps should also be considered within the scope of this disclosure. Furthermore, although multiple computing devices may execute one or more of the steps, this following details, for brevity, a single computer executing all of the steps of the illustrative method 300.

The method may begin at step 302, where the computer may receive a query for an event node from a user. The computer may display a graphical user interface with a search functionality and the user may utilize the search functionality to generate the query received by the computer. The search function may be implemented as a dialog box or a text window where the user may enter a search criteria. Non-limiting examples of search criteria for event nodes may include key words, time length, background of an event node, and environment for the event node.

In a next step 304, the computer may retrieve event nodes matching the query and display the event nodes in an interactive display. The computer may retrieve the event nodes from an event nodes database based on the query. As the event nodes can be queried, the user does not have to create every single event node from scratch. Instead the computer may retrieve the event nodes based upon the search criteria in the query. The computer may then display the event nodes in an interactive display. For example, the computer may display a list of event nodes and allow the user to customize displayed event nodes. Customization may include changing the text and/or images associated with a corresponding node. Alternatively or additionally, customization may include changing the functionality associated with a corresponding node.

In a next step 306, the computer may execute an event tree builder engine to generate a dynamic event tree from a plurality of event nodes. By executing the event tree builder engine computer may generate an interactive display where the user can, for example, drag and drop icons representing tree nodes to generate an event tree. The dynamic event tree may include the event nodes and dynamic event sequencers interconnecting the event nodes. In some embodiments, the computer may display a dynamic event tree template that the user can reconfigure to generate the dynamic event tree. The dynamic event tree template may have empty containers and reconfigurable dynamic event sequencers. The user may drag and drop the event nodes and modify the corresponding dynamic event sequencers to generate the dynamic event tree.

In a next step 308, the computer may execute a machine learning model to provide recommended event nodes. The machine learning model may continuously track the generation of the dynamic scenario tree. For example, the machine learning model may track the event nodes that were selected and the dynamic event sequencers used to interconnect the event nodes. The machine learning model may generate a recommended event node based upon the tracking data. The machine learning model may then generate the recommended event node. The computer may then present the recommended event node in the graphical user interface (or any other type of dashboard environment).

In a next step 310, the computer may train the machine learning model based upon the dynamic event tree and updates (if the recommended event node was accepted) to the event tree based upon the recommended event nodes. The machine learning model may learn the pattern in the dynamic event tree. Furthermore, the machine learning model may learn what type of recommended scenarios were accepted and what type of recommended event nodes were accepted.

In a next step 312, the computer may deploy the dynamic event tree. The dynamic event tree may be used for a corresponding computer based scenario training.

Figure 4:
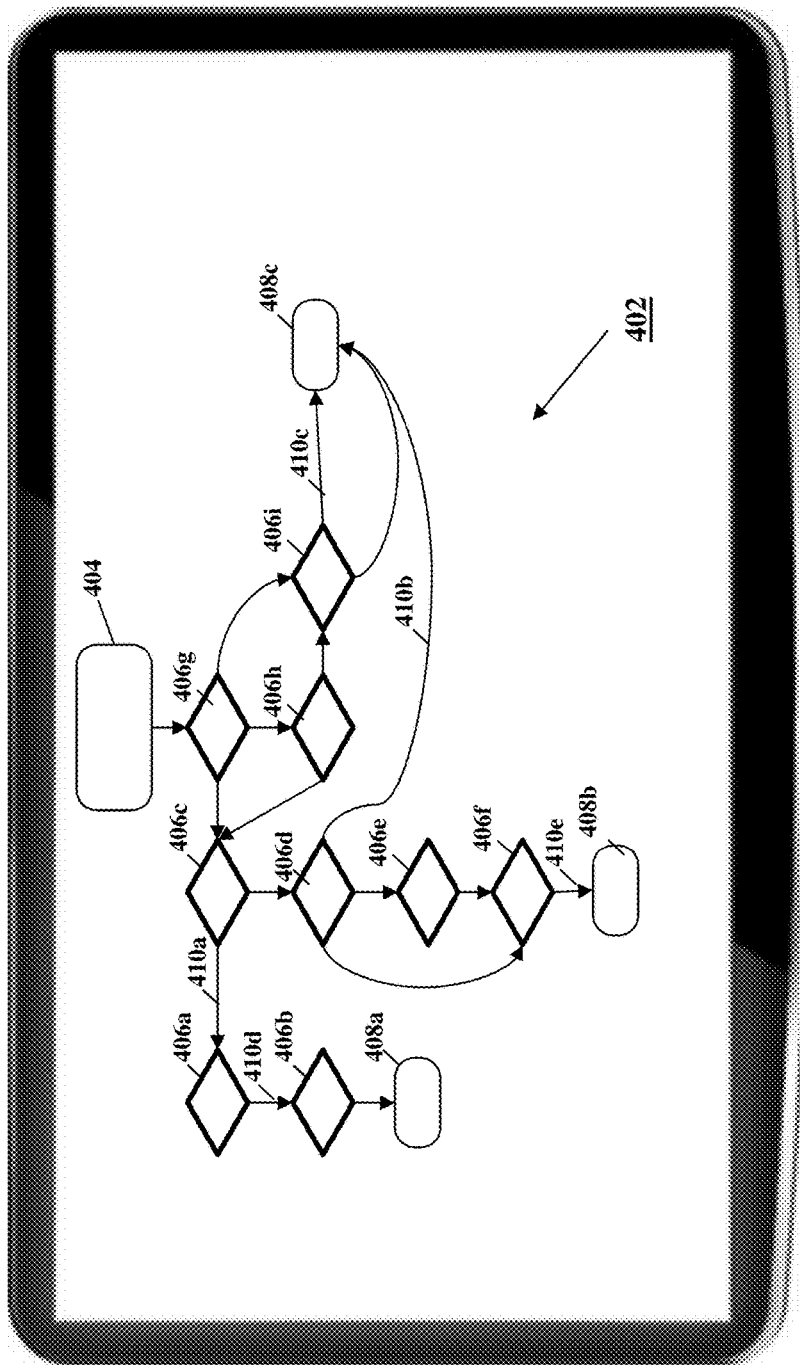
FIG. 4 shows a graphical user interface with an illustrative dynamic event tree, according to an embodiment.

FIG. 4 shows an illustrative graphical user interface (GUI) 400 displaying a dynamic event tree 402. A computer may generate the GUI 400 by executing one or more embodiments described herein. It should be understood that the dynamic event tree 402 is merely illustrative and other forms and types of dynamic event trees should also be considered within the scope of this disclosure.

The dynamic event tree 402 may include a start event tree node 404. The start event tree node 404 may include one or more conditions for starting of a computer based scenario based training. For example, the computer may execute computer program code associated with the start event tree node 404 to listen for the one or more conditions to start the training process. In some embodiments, the dynamic event tree 402 may be a sub-tree within a larger dynamic event tree framework and the start event tree node 404 may include conditions for the transition to the dynamic event tree 402 from a hierarchically higher sub-tree or another sub-tree within the larger dynamic event tree feedback.

The dynamic event tree may include a plurality of event tree nodes 406a-406i (collectively and commonly referred as 406). An event tree node 406 may be associated with a computer functionality for the corresponding state of the computer based scenario training. For example, the computer may execute computer program instructions associated with the event tree node 406 to display an animation, text, and/or image. As another example, the computer may provide one or more prompts for the trainee to respond.

The event tree nodes 406 may be arranged hierarchically based upon the sequence of scenarios to be presented to the trainee. For example, event tree node 406a may be hierarchically above the dynamic event tree node 406b such that the computer functionality of the event tree node 406a may be executed prior to the computer functionality of the event tree node 406b. It should be however be understood the depending upon the choices made by the trainees during the computer based scenario training, the computer may execute the functionality associated with a hierarchically lower event tree node 406 skipping one or more hierarchically higher event tree nodes. For example, based upon the choice made by the trainee during the execution of the functionality associated with the event tree node 406d, the computer may skip a hierarchically higher event tree node 406e to execute the functionality associated with hierarchically lower event tree node 406f.

The dynamic event tree 402 may further include result nodes 408a-408c (collectively and commonly referred to 408). The result node 408 may indicate the outcomes of the trainee taking a corresponding paths through the dynamic event tree 402. A computer based scenario training may have multiple successful resolutions and multiple unsuccessful resolutions. For example, in the dynamic event tree 402, result nodes 408a, 408c may indicate a successful resolution and result node 408b may indicate an unsuccessful resolution.

The event tree nodes 406 and the result nodes 408 may be interconnected by dynamic event sequencers, some of which have been labeled as 410a-410e. A dynamic event sequencer 410 may show the sequence of execution of computer functionality associated with the event tree 402 based upon the actions taken by the trainee during the training. In other words, the dynamic event sequencers 410 may dynamically modify the sequence of execution within the dynamic event tree 402 based upon the actions taken by the trainee.

In operation, the computer may load the dynamic event tree 402 for a corresponding computer-based scenario training session. The computer may first execute the functionality associated with start event tree node 404. Executing such functionality may allow the computer to determine if the conditions required for computer-based scenario training session have been met. Furthermore, by executing the functionality may allow the computer to load other environmental variables associated with the scenario training session. The environmental variables may include configuration of a graphical user interface associated with the training, the training level and expertise of the trainee, and/or any other environmental variables. The computer may perform other initialization tasks by executing the functionality associated with the start event tree node 404.

The computer may then execute the functionality associated with the event tree node 406g, next to the start event tree node 404. In response to a first action performed by the trainee at event tree node 406g, the computer may execute the functionality associated with the event tree node 406c. In response to a second action performed by the trainee by the trainee at event tree node 406g, the computer may execute the event tree node 406h. In response to a third action performed by the trainee at event tree node 406g, the computer may execute the event tree node 406i. Thereafter, the computer may iterate to through the remaining event tree nodes 406 until the computer reaches one of the result nodes 408a, 408b, 408c. As shown herein, reaching the result nodes 408a, 408c may indicate a successful resolution of a scenario associated with the dynamic event tree 402. Conversely, reaching the result node 408b may indicate an unsuccessful resolution of the scenario associated with the scenario associated with the dynamic event tree 402.

As described above, a trainer may rapidly reconfigure the dynamic event tree 402 during execution of the scenario based training associated with the dynamic event tree 402. The trainer may use the graphical user interface 400 to provide one or more edit instructions to the computer. The one or more edit instructions may be drag and drop operations or any other type of edit instructions.

EXAMPLE

A large organization may have to train its employees for resolving rapidly evolving situations. Every employee may have his or her own learning pace and may have to be trained to handle a wide variety of situations. Furthermore, the training scenarios may have to be dynamically modified during training sessions. A trainer may use the systems and methods described herein to create a dynamic event tree. In the dynamic event tree, the trainer may use previously created event nodes or use customized event nodes. The trainer may also create event nodes from scratch. A machine learning model constantly tracks the generation of the dynamic event tree provides one or more recommended event nodes. The trainer may accept or reject the recommended event nodes. The machine learning model continuously trains itself based upon the dynamic event tree and based upon whether the recommended event nodes were accepted by the trainer. The trainer may therefore easily and rapidly create a customized computer based scenario training and receive one or more recommendations. The customized computer based scenario training based on the dynamic event tree provides significant technical improvement over conventional pre-scripted training.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
    displaying, by a computer, a graphical user interface containing a plurality of event tree nodes retrieved from an event tree database based upon predetermined criteria;
    customizing, by the computer, at least one of a functionality and a display element of at least one node of the plurality of event tree nodes based upon one or more customization instructions received from a user, thereby generating at least one customized node of the plurality of event tree nodes;
    generating, by the computer, using data of a training scenario, a dynamic event tree containing one or more of the plurality of event tree nodes selected by the user and the at least one customized node, the dynamic event tree further containing dynamic event sequencers dynamically interconnecting the one or more event tree nodes based upon trainee responses within the training scenario to the event tree nodes, wherein each of the one or more event tree nodes is associated with a computer-executed functionality executed according to the dynamic interconnection of the one or more event tree nodes;
    executing, by the computer, a machine learning model to generate at least one recommended event tree node;
    updating, by the computer, the dynamic event tree to include the recommended event tree node and the at least one customized node in response to a user response accepting the recommended event tree node;
    further training, by the computer, the machine learning model based upon a pattern of the dynamic event tree, the user response to the recommended event tree node, and the update to the dynamic event tree; and
    deploying, by the computer, the dynamic event tree for computer based scenario training.

2. The computer-implemented method according to claim 1, wherein the predetermined criteria includes at least one of keywords, estimated time length, background, and training environment.

3. The computer-implemented method according to claim 1, wherein the one or more of the plurality nodes are selected using drag and drop operations.

4. The computer-implemented method according to claim 1, further comprising:
    displaying, by the computer, a dynamic event tree template configured to receive the one or more event tree nodes through drag and drop operations.

5. The computer-implemented method according to claim 1, further comprising initializing, by the computer, the machine learning model using supervised training.

6. The computer-implemented method according to claim 1, further comprising further training, by the computer, the machine learning model based upon the user not accepting the recommended event tree node.

7. The computer-implemented method according to claim 1, wherein the event tree database is a relational database.

8. The computer-implemented method according to claim 1, wherein the dynamic event tree includes at least one result node.

9. The computer-implemented method according to claim 1, wherein the computer displays the plurality of event tree nodes in a list view.

10. The computer-implemented method according to claim 1, further comprising:
    further updating, by the computer, the dynamic event tree in response to receiving one or more edit commands from the user.

11. A system comprising:
    a non-transitory storage medium storing an event tree database;
    a processor electrically coupled to the non-transitory storage medium and configured to:
        display a graphical user interface containing a plurality of event tree nodes retrieved from the event tree database based upon predetermined criteria;
        customize at least one of a functionality and a display element of at least one node of the plurality of event tree nodes to generate at least one customized node of the plurality of event tree nodes based upon one or more customization instructions received from a user;
        generate, using data of a training scenario, a dynamic event tree containing one or more of the plurality of event tree nodes selected by the user and the at least one customized node, the dynamic event tree further containing dynamic event sequencers dynamically interconnecting the one or more event tree nodes based upon trainee responses, within the training scenario, to the event tree nodes, wherein each of the one or more event tree nodes is associated with a computer-executed functionality executed according to the dynamic interconnection of the one or more event tree nodes;
        execute a machine learning model to generate at least one recommended event tree node;

update the dynamic event tree to include the recommended event tree node and the at least one customized node in response to a user response accepting the recommended event tree node;

further train the machine learning model based upon a pattern of the dynamic event tree, the user response to the recommended event tree node, and the update to the dynamic event tree; and deploy the dynamic event tree for computer based scenario training.

12. The system according to claim 11, wherein the predetermined criteria includes at least one of keywords, estimated time length, background, and training environment.

13. The system according to claim 11, wherein the one or more of the plurality nodes are selected using drag and drop operations.

14. The system according to claim 11, wherein the processor is further configured to:

display a dynamic event tree template configured to receive the one or more event tree nodes through drag and drop operations.

15. The system according to claim 11, wherein the processor is further configured to:

initialize the machine learning model using supervised training.

16. The system according to claim 11, wherein the processor is further configured to:

further train the machine learning model based upon the user not accepting the recommended event tree node.

17. The system according to claim 11, wherein the event tree database is a relational database.

18. The system according to claim 11, wherein the dynamic event tree includes at least one result node.

19. The system according to claim 11, wherein the processor is further configured to:

display the plurality of event tree nodes in a list view.

20. The system according to claim 11, wherein the processor is further configured to:

further update dynamic event tree in response to receiving one or more edit commands from the user.

\* \* \* \* \*